US009344930B2

(12) United States Patent
Anand et al.

(10) Patent No.: US 9,344,930 B2
(45) Date of Patent: May 17, 2016

(54) EFFICIENT WCDMA TO GSM TUNE AWAY PATTERN

(71) Applicant: QUALCOMM Incorporated, San Diego, CA (US)

(72) Inventors: Raghavendra Shyam Anand, Chickballapur (IN); Ramesh Kumar Gengiti, Farnborough (GB)

(73) Assignee: QUALCOMM Incorporated, San Diego, CA (US)

( * ) Notice: Subject to any disclaimer, the term of this patent is extended or adjusted under 35 U.S.C. 154(b) by 53 days.

(21) Appl. No.: 14/231,808

(22) Filed: Apr. 1, 2014

(65) Prior Publication Data
US 2015/0282019 A1 Oct. 1, 2015

(51) Int. Cl.
*H04W 36/30* (2009.01)
*H04W 68/00* (2009.01)
*H04W 36/00* (2009.01)
*H04W 88/06* (2009.01)
*H04W 8/18* (2009.01)
*H04W 60/00* (2009.01)
*H04W 76/04* (2009.01)

(52) U.S. Cl.
CPC .......... *H04W 36/0072* (2013.01); *H04W 36/30* (2013.01); *H04W 68/00* (2013.01); *H04W 8/183* (2013.01); *H04W 36/0088* (2013.01); *H04W 60/005* (2013.01); *H04W 76/048* (2013.01); *H04W 88/06* (2013.01)

(58) Field of Classification Search
CPC . H04W 36/30; H04W 36/18; H04W 36/0083; H04W 68/025; H04W 68/00
See application file for complete search history.

(56) References Cited

U.S. PATENT DOCUMENTS

| 8,452,312 | B1 | 5/2013 | Oroskar et al. | |
|---|---|---|---|---|
| 8,457,075 | B2 | 6/2013 | Parekh et al. | |
| 9,048,990 | B2* | 6/2015 | Chiu | H04L 1/0054 |
| 2006/0264224 | A1* | 11/2006 | Patel | H04L 1/0041 |
| | | | | 455/458 |
| 2008/0014935 | A1* | 1/2008 | Rick | H04W 68/00 |
| | | | | 455/434 |
| 2008/0268877 | A1 | 10/2008 | Harris | |

(Continued)

FOREIGN PATENT DOCUMENTS

WO 2014071246 A1 5/2014

OTHER PUBLICATIONS

Ericsson: "Dual-SIM Dual-Standby UEs and their impact on the RAN", 3GPP Draft; R2-115375 Dual-SIM Dual-Standby UEs and Their Impact on the RAN, 3rd Generation Partnership Project (3GPP), Mobile Competence Centre; 650, Route des Lucioles; F-06921 Sophia-Antipolis Cedex; France, vol. RAN WG2, no. Zhuhai; 20111010, Oct. 3, 2011, XP050540879, pp. 1-3, [retrieved on Oct. 3, 2011].

(Continued)

*Primary Examiner* — Sharad Rampuria
*Assistant Examiner* — Obidon Bassinan
(74) *Attorney, Agent, or Firm* — The Marbury Law Group, PLLC

(57) ABSTRACT

A method for performing tune away in a wireless communication device includes: tuning away the wireless communication device from a first communication network for a first tune away period to receive a first page burst from a second communication network, and during the first tune away period sequentially tuning to a plurality of neighbor cells of the second communication network and performing signal quality measurements on signals received from each of the plurality of neighbor cells.

20 Claims, 3 Drawing Sheets

(56) References Cited

U.S. PATENT DOCUMENTS

| | | | |
|---|---|---|---|
| 2009/0131054 A1* | 5/2009 | Zhang | H04W 76/04 455/436 |
| 2012/0057525 A1* | 3/2012 | Hou | H04W 72/1215 370/328 |
| 2012/0190362 A1 | 7/2012 | Subbarayudu et al. | |
| 2012/0258707 A1* | 10/2012 | Mathias | H04W 36/30 455/426.1 |
| 2013/0023275 A1 | 1/2013 | Mutya et al. | |
| 2013/0065644 A1* | 3/2013 | Bishop | H04W 8/183 455/558 |
| 2013/0244660 A1 | 9/2013 | Kumar et al. | |
| 2013/0260758 A1* | 10/2013 | Zhao | H04W 36/14 455/436 |
| 2013/0294417 A1* | 11/2013 | Yerrabommanahalli | H04W 40/24 370/335 |
| 2013/0295920 A1* | 11/2013 | Viswanadham | H04W 36/14 455/426.1 |
| 2014/0003397 A1* | 1/2014 | Goyal | H04W 72/0446 370/335 |
| 2014/0086209 A1* | 3/2014 | Su | H04W 74/02 370/331 |

OTHER PUBLICATIONS

International Search Report and Written Opinion—PCT/US2015/023678—ISA/EPO—Jun. 17, 2015.

* cited by examiner

EFFICIENT WCDMA TO GSM TUNE AWAY PATTERN

BACKGROUND

Wireless communication networks support communications for multiple users by sharing the available network resources. Some wireless devices are configured to facilitate communication on two separate networks via two separate subscriptions. For example, dual-Subscription Identity Module (SIM), dual standby (DSDS) devices may include two SIM cards—one card for a first subscription and a second card for a second subscription and are capable of receiving services from two different networks.

A DSDS mobile communication device that supports both wideband code division multiple access (WCDMA) and global system for mobile communication (GSM) SIMs must tune away from WCDMA to receive GSM page bursts when the WCDMA SIM is in the dedicated channel (DCH) or forward access channel (FACH) state. Most GSM idle mode activity involves reception of one slot from a time domain multiple access (TDMA) frame. Some GSM activities must be done synchronous to the network, while other activities such as measurements can be done asynchronous to the network.

During tune away, measurements may be combined with page reception to reduce the duration of the tune away gap. However, where only one burst length time is given for GSM, measurements need to be done separately. Considering that five to six measurements are typically performed for GSM per discontinuous reception (DRX) wake up, the number of tune away gaps per DRX cycle increases significantly. However, more interruptions in transmission affect WCDMA quality of service (QoS) almost as much as long tune away gaps.

SUMMARY

Apparatuses, systems, and methods for efficient WCDMA to GSM tune away in a wireless communication device are provided.

According to various embodiments there is provided a wireless communication device. The wireless communication device may include: a communication unit configured to transmit and receive according to a first radio access technology and a second radio access technology; and a control unit configured to control the communication unit to communicate with a first communication network according to the first radio access technology and a second communication network according to the second radio access technology.

The control unit may be configured to control the communication unit to tune away from the first communication network for a first tune away period to receive a first page burst from the second communication network, and during the first tune away period, may be configured to control the communication unit to sequentially tune to a plurality of neighbor cells of the second communication network and perform signal quality measurements on the signals received from each of the plurality of neighbor cells.

According to various embodiments there is provided a method for performing tune away in a wireless communication device. The method may include: tuning away the wireless communication device from a first communication network for a first tune away period to receive a first page burst from a second communication network; and during the first tune away period sequentially tuning to a plurality of neighbor cells of the second communication network and performing signal quality measurements on signals received from each of the plurality of neighbor cells.

According to various embodiments there is provided a non-transitory computer readable medium having stored therein a program for making a processor execute a method for performing tune away in a wireless communication device. The program may include computer executable instructions for performing steps including: tuning away the wireless communication device from a first communication network for a first tune away period to receive a first page burst from a second communication network; and during the first tune away period sequentially tuning to a plurality of neighbor cells of the second communication network and performing signal quality measurements on signals received from each of the plurality of neighbor cells.

Other features and advantages of the present inventive concept should be apparent from the following description which illustrates by way of example aspects of the present inventive concept.

BRIEF DESCRIPTION OF THE DRAWINGS

Aspects and features of the present inventive concept will be more apparent by describing example embodiments with reference to the accompanying drawings, in which.

DETAILED DESCRIPTION

While certain embodiments are described, these embodiments are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

Various embodiments provide apparatuses, systems, and methods for efficient WCDMA to GSM tune away in a DSDS wireless communication device.

Figure 1:
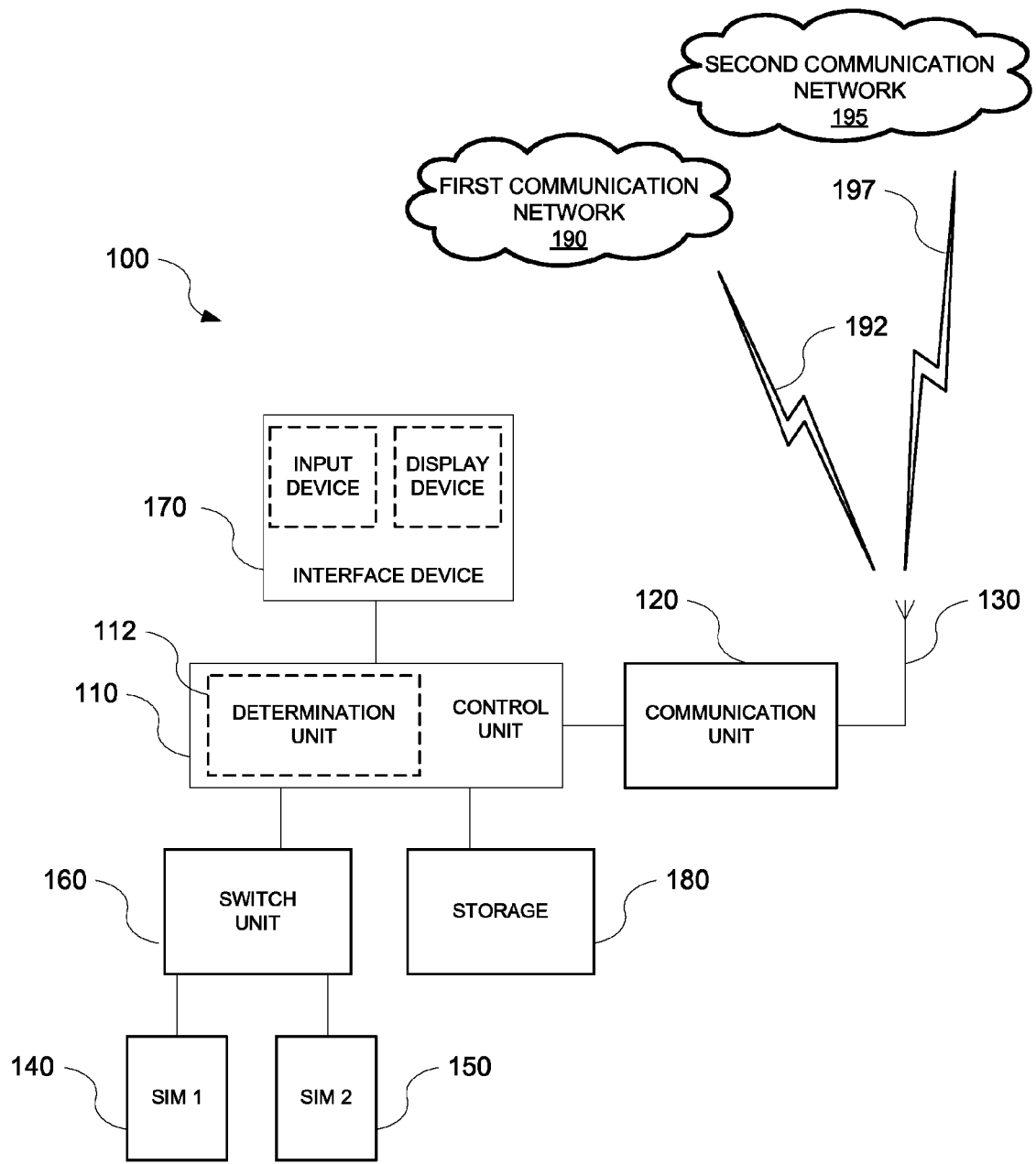
FIG. 1 is a functional block diagram illustrating a DSDS wireless communication device according to various embodiments of the disclosure.

FIG. 1 is a functional block diagram illustrating a DSDS wireless communication device according to various embodiments of the disclosure. As illustrated in FIG. 1, a wireless communication device 100 may include a control unit 110, a communications unit 120, an antenna 130, a first SIM 140, a second SIM 150, a switch unit 160, an interface device 170, and storage 180. The first SIM 140 may associate the first communications unit 120 with a first subscription 192 on a first communication network 190 and the second SIM 150 may associate the first communications unit 120 with a second subscription 197 on a second communication network 195. The wireless communication device 100 may be, for example but not limited to, a mobile telephone, smartphone, tablet, computer, etc., capable of communications with one or more wireless networks. One of ordinary skill in the art will appreciate that the communications unit may include one or more transceivers and interface with one or more antennas without departing from the scope of the present inventive concept.

The first and second communication networks 190 and 195 may be operated by the same or different service providers, and/or may support the same or different technologies, for example, but not limited to, WCDMA and GSM.

The control unit 110 controls overall operation of the mobile device 100 including control of the communications unit 120, switch unit 160, interface device 170, and storage 180. The control unit 110 may be a programmable device, for example, but not limited to, a microprocessor or microcontroller. The control unit 110 may include a determination unit 112 which determines whether a GSM page block has been successfully decoded. Alternatively, the determination unit 112 may be implemented as electronic circuitry separate from the control unit 110. The control unit 110 may control the switch unit 160 to select the first SIM 140, for example a WCDMA SIM, or the second SIM 150, for example a GSM SIM, based on which subscription is active. The storage 180 may store application programs necessary for operation of the wireless communication device 100 that are executed by the control unit 110, as well as application data and user data. The display device 174 may be, for example, but not limited to, a liquid crystal display (LCD).

The control unit 110 may control the communications unit 120 and switch unit 160 to determine whether the WCDMA or GSM SIM is active or idle for the wireless communication device 100. In active mode, a transceiver receives and transmits signals. In idle mode, a transceiver receives but does not transmit signals. While in idle mode, the SIM wakes up periodically to tune away to receive page bursts and measure signal quality of neighboring cells. For example, when in idle mode, the GSM SIM must tune away from WCDMA to receive GSM page bursts when the WCDMA SIM is in the DCH or FACH state.

Four page bursts (or other suitable number of page bursts) in successive TDMA frames are transmitted by the GSM network. A GSM page block may be successfully decoded during tune away from WCDMA to GSM after receiving only one burst (or two or three bursts), or in some embodiments, all four bursts are received before the page block is successfully decoded. In addition, during tune away, the GSM SIM typically measures signal quality of approximately (but not limited to) five neighboring base stations. According to particular embodiments, the tune away duration from WCDMA should be kept as short as possible to reduce the impact to quality of service (QoS) or throughput of the WCDMA call.

Figure 2:
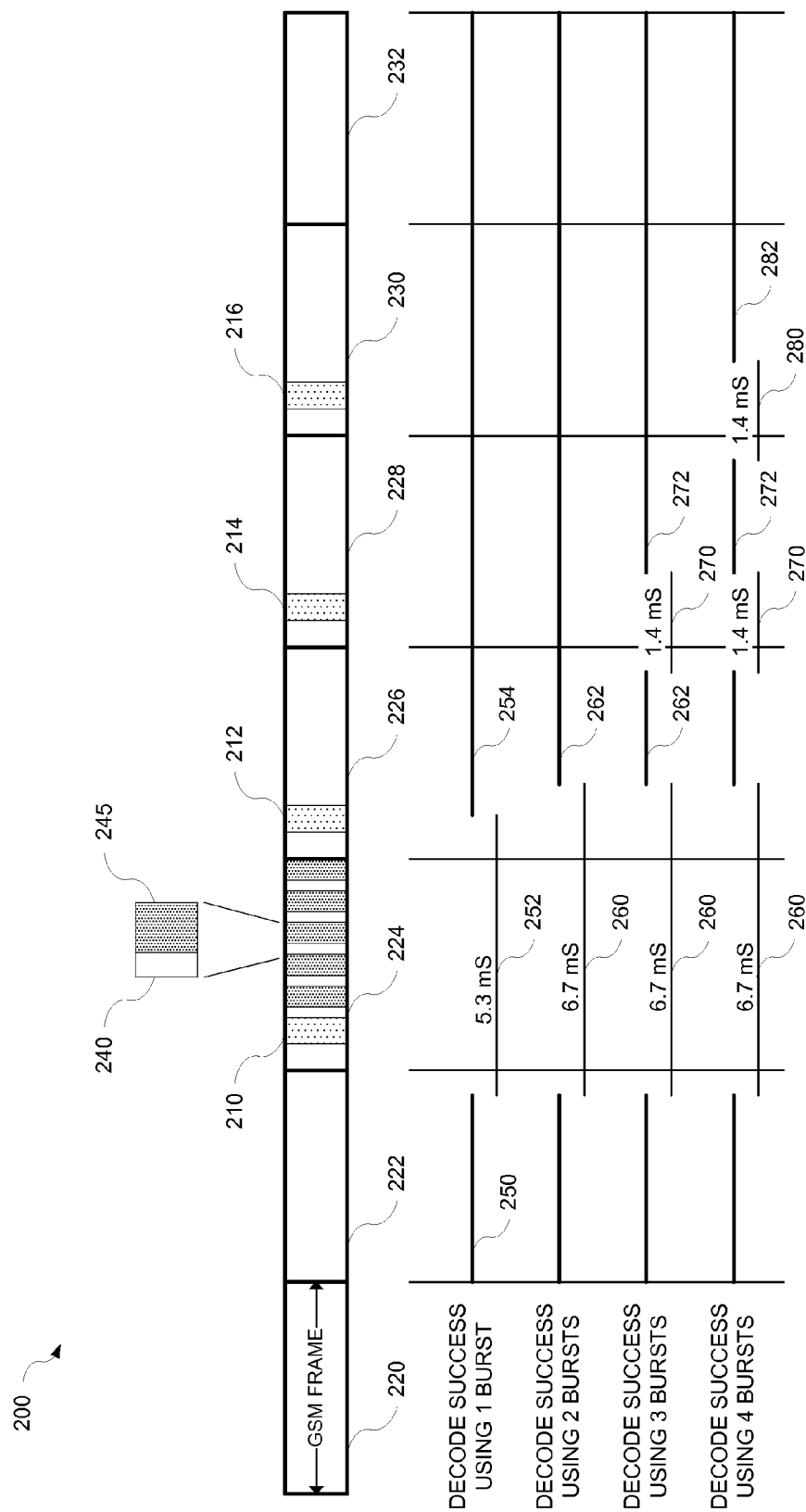
FIG. 2 is a diagram illustrating a tune away pattern according to various embodiments of the disclosure.

FIG. 2 is a diagram illustrating a tune away pattern according to various embodiments of the disclosure. Referring to the upper portion of FIG. 2, several GSM frames 220-232 are illustrated with four GSM page bursts 210-216 received in four successive GSM TDMA frames 224-230. With reference to FIGS. 1-2, after the first page burst 210, the control unit 110 causes the communications unit 120 to tune to the absolute radio frequency channel number (ARFCN) of a first neighbor cell and measures signal quality received from that cell. A tuning period 240 and a signal quality measurement period 245 for each neighboring cell to be measured (in this example, five neighbor cells) are combined in the same GSM frame 224 following the first GSM page burst 210.

The lower portion of FIG. 2 illustrates the timing of the tune away pattern according to various embodiments of the disclosure. The heavier lines in the lower portion of FIG. 2 indicate times when the WCDMA SIM is active and the communications unit 120 (refer to FIG. 1) is communicating with the WCDMA network, and the lighter lines indicate times when the GSM SIM is active and the communications unit 120 is communicating with the GSM network.

With reference to FIGS. 1-2, a GSM page block may be successfully decoded during tune away from WCDMA to GSM after receiving one GSM page burst, two GSM page bursts, three GSM page bursts, or all four GSM page bursts may be received before the page is successfully decoded. The wireless communication device 100 is initially communicating 250 with the WCDMA network (e.g., the first communication network 190) using the WCDMA SIM (e.g., the first SIM 140). During wake up of the GSM SIM (e.g., the second SIM 150), the control unit 110 causes the switching unit 160 to switch to the GSM SIM and the communications unit 120 to tune away 252 to communicate with the GSM network (e.g., the second communication network 195). For example, the first tune away period 252 may have (but is not limited to) a duration of approximately 5.3 ms.

During the first tune away period 252, the wireless communication device 100 receives the first GSM page burst 210. After receiving the first GSM page burst 210, the control unit 110 causes the communications unit 120 to sequentially tune 240 to the ARFCNs of each neighboring cell to be measured and performs signal quality measurements 245 for each of the neighboring cells (five in this example) to be measured. One of ordinary skill in the art will appreciate that the mobile device may tune to and measure signal quality of more or less than five neighboring cells without departing from the scope of the present inventive concept.

After the signal quality measurements for the final neighboring cell to be measured have been performed, the determination unit 112 determines whether the first tune away period 252 was sufficient to successfully decode a GSM page block. The determination unit 112 may make this determination based on any suitable metric(s) and/or criteria. If the GSM page block has been successfully decoded after the first GSM page burst 210, the control unit 110 causes the switching unit 160 to switch back to the WCDMA SIM and the communications unit 120 to tune back 254 to communicate with the WCDMA network. The WCDMA SIM remains active until the next wake up period for the GSM SIM.

If the determination unit 112 determines that the first tune away period 252 was not sufficient to successfully decode the GSM page block from the first GSM page burst 210, the first tune away period is extended 260 to approximately 6.7 ms (or other predetermined amount of time) to receive the second GSM page burst 212. After the second GSM page burst 212 is received, the control unit 110 causes the switching unit 160 to switch back to the WCDMA SIM and the communications unit 120 to tune back 262 to communicate with the WCDMA network. If the determination unit 112 determines that the extended first tune away period 260 was sufficient to successfully decode the GSM page block from the second GSM page burst 212, the WCDMA SIM remains active until the next wake up period for the GSM SIM.

If the determination unit 112 determines that the extended first tune away period 260 was not sufficient to successfully decode the GSM page block from the second GSM page burst 212, a second tune away 270 for approximately 1.4 ms (or other predetermined amount of time) is performed to receive the third GSM page burst 214, after which the communications unit 120 is tuned back 272 to communicate with the WCDMA network. If the determination unit 112 determines that the second tune away period 270 was sufficient to successfully decode the GSM page block from the third GSM page burst 214, the WCDMA SIM remains active until the next wake up period for the GSM SIM.

If the determination unit 112 determines that the second tune away period 270 was not sufficient to successfully decode the GSM page block from the third GSM page burst 212, a third tune away 280 for approximately 1.4 ms (or other predetermined amount of time) is performed to receive the fourth GSM page burst 216, after which the communications unit 120 is tuned back 282 to communicate with the WCDMA network. The WCDMA SIM remains active until the next wake up period for the GSM SIM.

It should be noted that reception of the GSM page bursts 210-216 are performed synchronously with the GSM network, but the tuning to and signal quality measurements of the neighboring cells may be performed asynchronously. Further, it should be noted that the tuning to and signal quality measurements of the neighboring cells are performed only after reception of the first GSM page burst during the first tune away period (e.g., approximately 5.3 ms).

Figure 3:
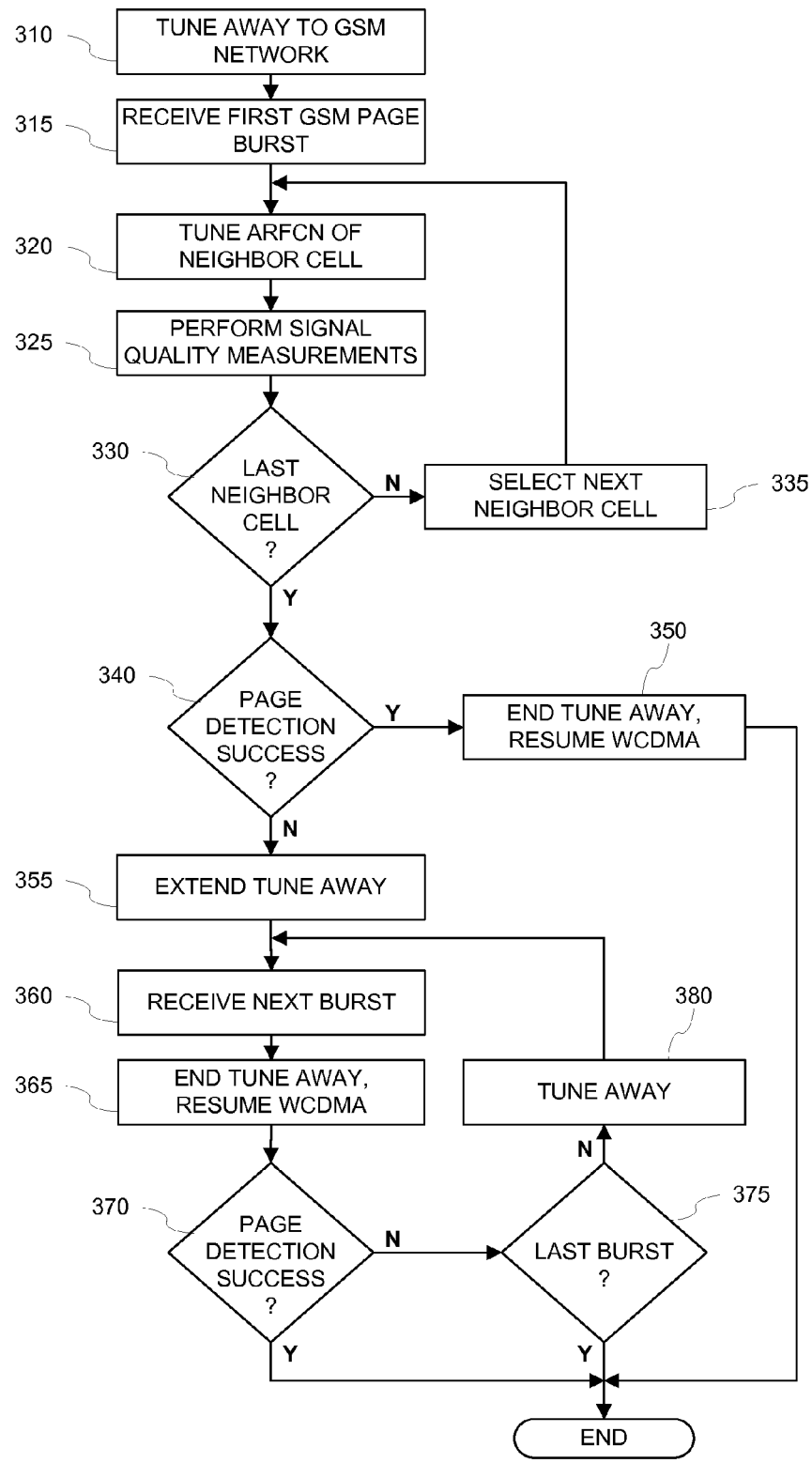
FIG. 3 is a flowchart illustrating a method for efficient WCDMA to GSM tune away according to various embodiments of the disclosure.

FIG. 3 is a flowchart illustrating a method for efficient WCDMA to GSM tune away according to various embodiments of the disclosure.

With reference to FIGS. 1-3, the wireless communication device 100 is initially communicating 250 with the WCDMA network using the WCDMA SIM. During wake up of the GSM SIM, the control unit 110 causes the switching unit 160 to switch to the GSM SIM and the communications unit 120 to tune away 252 to communicate with the GSM network (310). The first tune away period 252 may have, for example, a duration of approximately 5.3 ms.

During the first tune away period 252, the wireless communication device 100 receives the first GSM page burst 210 (315) and then tunes 240 to the ARFCNs of a neighboring cell (320) and performs signal quality measurements 245 (325). The tuning and measurement process continues (330-N) for each neighboring cell to be measured (335). One of ordinary skill in the art will appreciate that the wireless communication device 100 may tune to and measure signal quality of more or less than five neighboring cells without departing from the scope of the present inventive concept.

After the signal quality measurements for the final neighboring cell to be measured have been performed (330-Y), the determination unit 112 determines whether the first tune away period 252 was sufficient to successfully decode a GSM page block (340). If the GSM page block has been successfully decoded after the first GSM page burst 210 (340-Y), the control unit 110 causes the switching unit 160 to switch back to the WCDMA SIM and the communications unit 120 to tune back 254 to communicate with the WCDMA network (350). The WCDMA SIM remains active until the next wake up period for the GSM SIM.

If the determination unit 112 determines that the first tune away period 252 was not sufficient to successfully decode the GSM page block from the first GSM page burst 210 (340-N), the first tune away period is extended 260 (355) to approximately 6.7 ms to receive the second GSM page burst 212 (360). After the second GSM page burst 212 is received, the control unit 110 causes the switching unit 160 to switch back to the WCDMA SIM and the communications unit 120 to tune back 262 to communicate with the WCDMA network (365). If the determination unit 112 determines that the extended first tune away period 260 was sufficient to successfully decode the GSM page block (370-Y) from the second GSM page burst 212, the WCDMA SIM remains active until the next wake up period for the GSM SIM.

If the determination unit 112 determines that the extended first tune away period 260 was not sufficient to successfully decode the GSM page (370-N) from the second GSM page burst 212, a second tune away period 270 lasting, for example, for approximately 1.4 ms is performed (380) to receive the third GSM page burst 214 (360), after which the wireless communication device 100 is tuned back 272 to communicate with the WCDMA network 365). If the determination unit 112 determines that the second tune away period 270 was sufficient to successfully decode the GSM page block (370-Y) from the third GSM page burst 214, the WCDMA SIM remains active until the next wake up period for the GSM SIM.

If the determination unit 112 determines that the second tune away period 270 was not sufficient to successfully decode the GSM page block (370-N) from the third GSM page burst 212, a third tune away period 280 lasting, for example, for approximately 1.4 ms is performed (380) to receive the fourth GSM page burst 216 (360), after which the wireless communication device 100 is tuned back 282 to communicate with the WCDMA network (365). If page block detection was successful (370-Y) or the last GSM page burst was received (375-Y), the WCDMA SIM remains active until the next wake up period for the GSM SIM.

While certain embodiments have been described, these embodiments have been presented by way of example only, and are not intended to limit the scope of the protection. The apparatuses, methods, and systems described herein may be embodied in a variety of other forms. Various omissions, substitutions, and/or changes in the form of the example apparatuses, methods, and systems described in this disclosure may be made without departing from the spirit of the protection.

The accompanying claims and their equivalents are intended to cover such forms or modifications as would fall within the scope and spirit of the protection. For example, the example apparatuses, methods, and systems disclosed herein can be applied to multi-SIM wireless devices subscribing to multiple communication networks and/or communication technologies. The various components illustrated in the figures may be implemented as, for example, but not limited to, software and/or firmware on a processor, ASIC/FPGA/DSP, or dedicated hardware. Also, the features and attributes of the specific example embodiments disclosed above may be combined in different ways to form additional embodiments, all of which fall within the scope of the present disclosure.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an," or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A wireless communication device, comprising:
   a communication unit configured to transmit and receive according to a first radio access technology and a second radio access technology; and
   a control unit configured to control the communication unit to communicate with a first communication network according to the first radio access technology and a second communication network according to the second radio access technology,
   wherein the control unit is configured to control the communication unit to tune away from the first communication network for a first tune away period to receive a first page burst from the second communication network; and
   wherein the control unit, during an attempt to decode a page block from the first page burst within the first tune away period, is configured to control the communication unit to sequentially tune to a plurality of neighbor cells of the second communication network and perform signal quality measurements on signals received from each of the plurality of neighbor cells.

2. The wireless communication device of claim 1, wherein the control unit is configured to control the communication unit to sequentially tune to the plurality of neighbor cells and to perform the signal quality measurements only during the first tune away period.

3. The wireless communication device of claim 1, wherein the first tune away period is a predetermined amount of time.

4. The wireless communication device of claim 1, further comprising:
   a switch unit configured to switch between a first subscription identity module (SIM) and a second SIM, the first SIM configured to associate the wireless communication device with the first radio access technology, the second SIM configured to associate the wireless communication device with the second radio access technology;
   wherein the control unit is configured to control the switch unit to switch from the first SIM to the second SIM during a wake up period of the second SIM to communicate with the second communication network for the first tune away period.

5. The wireless communication device of claim 4, wherein the first SIM is a wideband code division multiple access (WCDMA) SIM and the second SIM is a global system for mobile communication (GSM) SIM.

6. The wireless communication device of claim 4, wherein the first radio access technology is different from the second radio access technology.

7. The wireless communication device of claim 1, further comprising:
   a determination unit configured to determine whether the first page burst received during the first tune away period was sufficient to successfully decode the page block,
   wherein in response to a determination by the determination unit that the first page burst was not sufficient to successfully decode the page block, the control unit is configured to extend the first tune away period to receive a second page burst, and to control the communication unit to tune back to the first communication network after the second page burst is received.

8. The wireless communication device of claim 7, wherein the first tune away period is extended a predetermined amount of time.

9. The wireless communication device of claim 7, wherein in response to a determination by the determination unit that the second page burst received during the extended first tune away period was not sufficient to successfully decode the page block, the control unit is configured to control the communication unit to tune away from the first communication network for a second tune away period shorter than the first tune away period to receive a third page burst from the second communication network, and to control the communication unit to tune back to the first communication network after the third page burst is received.

10. The wireless communication device of claim 9, wherein in response to a determination by the determination unit that the third page burst received during the second tune away period was not sufficient to successfully decode the page block, the control unit is configured to control the communication unit to tune away from the first communication network for a third tune away period shorter than the first tune away period to receive a fourth page burst from the second communication network, and to control the communication unit to tune back to the first communication network after the fourth page burst is received.

11. A method for performing tune away in a wireless communication device, the method comprising:
  tuning away the wireless communication device from a first communication network for a first tune away period to receive a first page burst from a second communication network; and
  during an attempt to decode a page block from the first page burst within the first tune away period, sequentially tuning to a plurality of neighbor cells of the second communication network and performing signal quality measurements on signals received from each of the plurality of neighbor cells.

12. The method of claim 11, wherein the sequential tuning to the plurality of neighbor cells and performing signal quality measurements occurs only during the first tune away period.

13. The method of claim 11, wherein the first tune away period is a predetermined amount of time.

14. The method of claim 11, further comprising:
  determining whether the first page burst received during the first tune away period was sufficient to successfully decode the page block,
  wherein in response to determining that the first page burst was not sufficient to successfully decode the page block, the method further comprising extending the first tune away period to receive a second page burst and tuning the wireless communication device back to the first communication network after the second page burst is received.

15. The method of claim 14, wherein the first tune away period is extended a predetermined amount of time.

16. The method of claim 14, wherein in response to determining that the second page burst received during the extended first tune away period was not sufficient to successfully decode the page block, the method further comprising:
  tuning the wireless communication device away from the first communication network for a second tune away period shorter than the first tune away period to receive a third page burst from the second communication network; and
  tuning the wireless communication device back to the first communication network after the third page burst is received.

17. The method of claim 16, wherein in response to determining that the third page burst received during the second tune away period was not sufficient to successfully decode the page block, the method further comprising:
  tuning the wireless communication device away from the first communication network for a third tune away period shorter than the first tune away period to receive a fourth page burst from the second communication network; and
  tuning the wireless communication device back to the first communication network after the fourth page burst is received.

18. The method of claim 11, wherein the first communication network is a wideband code division multiple access (WCDMA) network and the second communication network is a global system for mobile communication (GSM) network.

19. The method of claim 11, wherein the first communication network is associated with a first radio access technology that is different from a second radio access technology associated with the second communication network.

20. A non-transitory computer readable medium having stored therein a program for making a processor execute a method for performing tune away in a wireless communication device, said program including computer executable instructions for performing steps comprising:
  tuning away the wireless communication device from a first communication network for a first tune away period to receive a first page burst from a second communication network; and
  during an attempt to decode a page block from the first page burst within the first tune away period, sequentially tuning to a plurality of neighbor cells of the second communication network and performing signal quality measurements on signals received from each of the plurality of neighbor cells.

* * * * *